United States Patent [19]

Neumayer

[11] 4,120,231
[45] Oct. 17, 1978

[54] HOLLOW WALL FASTENER

[76] Inventor: George A. Neumayer, 890 Brand La., Deerfield, Ill. 60015

[21] Appl. No.: 767,542

[22] Filed: Feb. 10, 1977

[51] Int. Cl.² .......................................... F16B 37/04
[52] U.S. Cl. ................................................. 85/3 R
[58] Field of Search ............... 85/3 R, 3 S, 3 K, 32 K; 151/41.7, 41.74, 43, 6

[56] References Cited

U.S. PATENT DOCUMENTS

| | | | |
|---|---|---|---|
| 738,660 | 9/1903 | Chittum | 151/6 |
| 860,636 | 7/1907 | Church | 151/41.7 |
| 1,040,341 | 8/1912 | Jensen | 85/3 R |
| 2,519,511 | 8/1950 | Stelter | 85/3 R |
| 2,609,723 | 9/1952 | Stubbs | 85/3 K |
| 2,908,196 | 10/1959 | Apfelzweig | 85/3 R |
| 3,605,547 | 9/1971 | Millet | 85/3 S |
| 3,707,898 | 1/1973 | Holly | 85/3 R |
| 3,927,597 | 12/1975 | Stults | 85/3 R |

FOREIGN PATENT DOCUMENTS

1,296,883 6/1969 Fed. Rep. of Germany ........... 85/3 R
222,904 10/1924 United Kingdom .................... 85/3 R Primary Examiner—Marion Parsons, Jr.
Attorney, Agent, or Firm—Mason, Kolehmainen, Rathburn & Wyss

[57] ABSTRACT

A hollow wall fastener for insertion in a hole formed in a wall panel between the inner and outer faces comprises an elongated body adapted for longitudinal insertion into the panel hole. The body includes a pair of spaced apart, parallel, legs interconnected by an integral transverse cross member. A toggle element is pivotally mounted adjacent inner end portions of the legs for movement about a transverse pivot axis between the legs. The toggle is pivotable from a first position aligned with the legs during insertion of the fastener and a second position generally normal to the legs wherein a face of the toggle element is adapted to bear against the inside surface of the wall after the element clears the hole on insertion. A deflectable finger is integrally formed on the transverse cross member and includes a free end portion extending between the legs for biasing the toggle element from the aligned position during insertion towards the toggle locking position after the toggle element has cleared the hole.

7 Claims, 8 Drawing Figures

HOLLOW WALL FASTENER

BACKGROUND OF THE INVENTION

1. Field of the Invention

The present invention relates to a new and improved hollow wall fastener of the type designed for longitudinal insertion in a hole formed in a wall panel between the inner and outer surface. More particularly, the hollow wall fastener of the present invention is especially well adapted for use with gypsum board, dry wall or various types of wall panels. The hollow wall fastener is insertable from the outer surface of the panel and is then secured against pull out by contact against the inner or blind side of the panel which is normally not accessible.

2. Description of the Prior Art

A great number of toggle type prior art fasteners have been developed. U.S. Pat. Nos. 1,374,926; 1,374,905; 1,374,959; 1,694,494; 2,132,284; 2,565,391; 2,682,190; 2,733,629; 2,998,743 and 3,168,850, disclose toggle type fasteners employing separate spring elements for biasing a toggle element into a toggle locking position once inside a hollow wall after insertion of the element from an opening in the outer surface of the wall panel. U.S. Pat. Nos. 2,908,196 and 3,707,898 employ toggle type fasteners wherein a cam surface is engageable with the threaded end of a screw fastening bolt which is operable to move the toggle into a locking position.

Other types of toggle fasteners utilize a screw fastener for drawing up a toggle nut and some of these type are shown in U.S. Pat. Nos. 3,707,898 and 3,872,768. U.S. Pat. No. 3,532,024 shows a toggle fastener with an integral plastic hinge for moving the toggle to the locking position. U.S. Pat. No. 3,605,547 shows a toggle arrangement wherein a resilient strap is interconnected to the toggle element and U.S. Pat. Nos. 1,040,341 and 1,374,924 show toggle fasteners wherein the toggle element is freely pivotable into the locking position without aid from springs, cams, screw fasteners or the like.

It is an object of the present invention to provide a new and improved hollow wall fastener for use in hollow walls behind an opening in a wall panel between the inner and outer faces thereof.

More particularly, it is an object of the present invention to provide a new and improved hollow wall fastener of the character described which is low in cost, easy to install and reliable in operation to provide good holding or fastening characteristics for elements secured thereto.

Another object of the present invention is to provide a new and improved hollow wall fastener of the character described which employs an integrally formed deflectable finger for biasing the toggle element into locking position after insertion of the fastener in the opening of a wall panel.

Yet another object of the present invention is to provide a toggle wall fastener of the character described wherein screw fasteners, cams and/or separate spring devices are not needed for biasing the toggle element into a locking position.

Yet another object of the invention is to provide a new and improved toggle type hollow wall fastener wherein the toggle element is constructed so that it is also biased by gravity into a toggle locking position after the element clears the inside blind surface of the wall panel.

SUMMARY OF THE INVENTION

The foregoing and other objects and advantages of the present invention are accomplished in the illustrated embodiments which disclose a new and improved hollow wall fastener of the type adapted to be inserted into a hollow wall through a hole formed in a wall panel between the inner and outer faces thereof. The fastener includes an elongated body adapted to be longitudinally inserted into the hole from outside the wall and the body is formed by a pair of spaced apart, parallel legs which are integrally interconnected by a transverse cross-member. The toggle element is pivotally mounted adjacent the inner end portion of the legs for pivotal movement about a transverse pivot axis extending between the legs. The toggle element is maintained in a first position aligned parallel and between the legs during insertion of the body into the hole and is pivotal into a second toggle locking position generally normal to the inner wall face with a surface on the element to bear against the inner wall face after the toggle element has cleared the hole on insertion. A deflectable finger is integrally formed on the transverse cross-member includes a free end portion which extends between the legs and normally biases the toggle element out of the aligned position towards the toggle locking position. Once the toggle element is inserted past the inner face of the wall panel, the deflectable finger acts to bias the toggle element to pivot into the toggle locking position and the legs of the fastener body are then pulled outwardly to firmly seat the bearing face of the toggle element against the inner wall face. The outer portion of the legs are then bent or folded outwardly to secure the fastener firmly in place. The toggle element may be provided with a hollow threaded aperture for receiving a conventional screw type fastener inserted from outside the wall panel between the elongated legs of the fastener within the hole.

BRIEF DESCRIPTION OF THE DRAWINGS

For better understanding of the present invention, reference should be had to the following detailed description taken in conjunction with the drawings in which.

DESCRIPTION OF THE PREFERRED EMBODIMENTS

Figure 2:
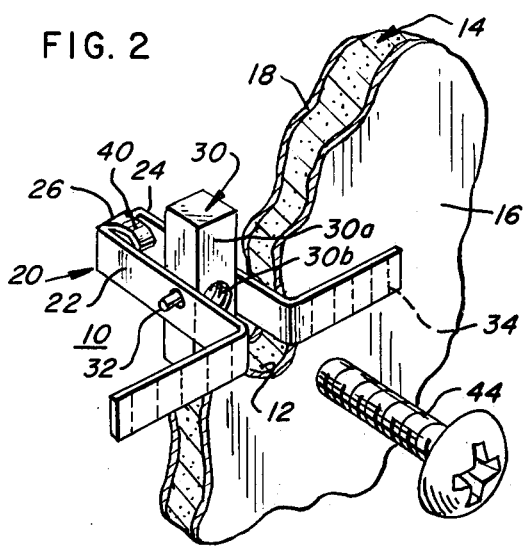
FIG. 2 is a perspective view of the hollow wall fastener as seen from outside the hollow wall in which the fastener is installed.
Figure 1:
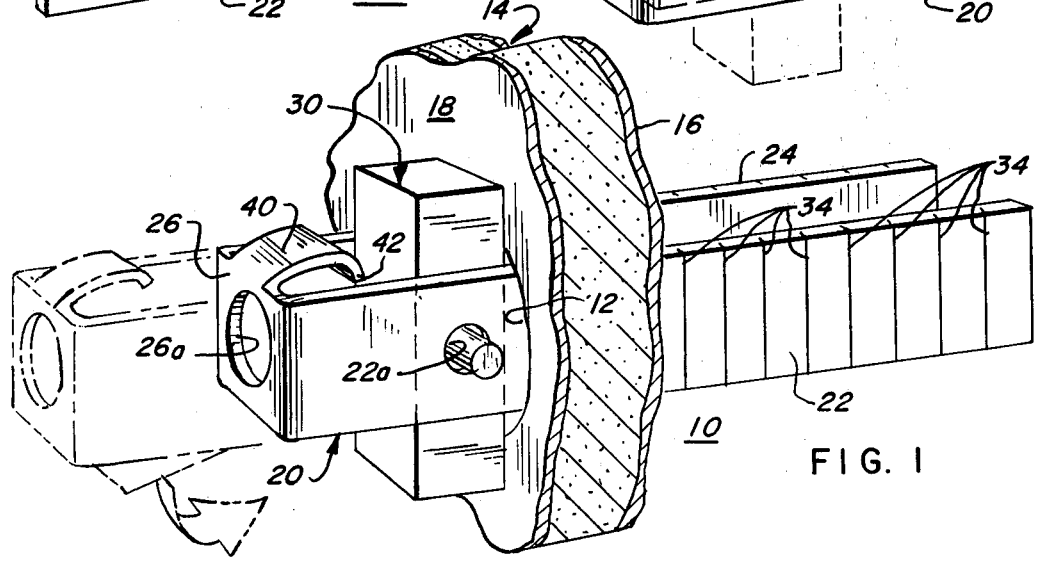
FIG. 1 is a perspective view of a new and improved hollow wall fastener constructed in accordance with the features of the present invention and shown with a toggle element in a toggle locking position against the blind or inside surface of a wall panel.

Referring now more particularly to the drawings, in FIGS. 1 and 2 is illustrated a new and improved hollow wall fastener constructed in accordance with the features of the present invention and referred to generally by the reference numeral 10. The fastener 10 is adapted to be inserted in a hole 12 formed in hollow wall having a wall panel 14 with an outer face 16 and a blind or inner face 18 which is not normally accessible. The fastener comprises an elongated body 20 formed of light metal, plastic or the like and includes a pair of parallel legs 22 and 24 integrally joined and spaced apart by a transverse cross-member 26 adjacent the inner ends of the legs.

Figure 4:
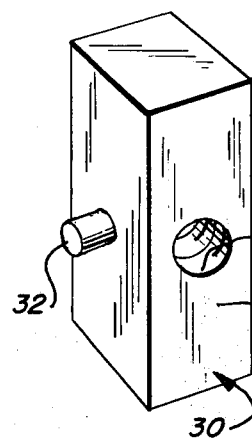
FIG. 4 is a perspective view of a toggle element of the hollow wall fastener in accordance with the present invention.
Figure 5:
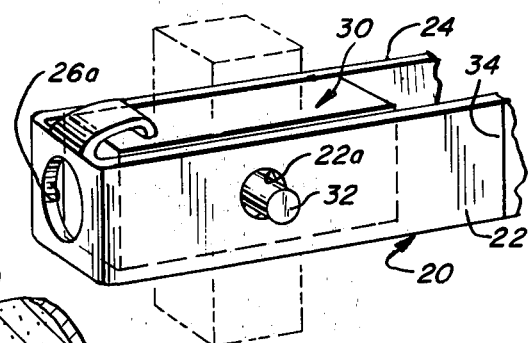
FIG. 5 is a fragmentary perspective view similar to FIG. 3 showing assembled together an elongated body and a toggle element in aligned position. The toggle element is shown in phantom on upright toggle locking position.

A toggle element 30 of generally rectangular shape (FIG. 4) is mounted for pivotal movement between the legs 22 and 24 and is adapted to pivot about a transverse pivot axis which extends coaxially between a pair of circular apertures 22a and 24a formed in the respective legs 22 and 24 adjacent inner end portions thereof. The rectangular toggle element is supported in the apertures on a pair of short axles 32 extending outwardly from opposite side faces thereon. During a longitudinal insertion of the wall fastener 10 into the hole 12 of the wall panel 14, the toggle element 30 is maintained in aligned position as shown in solid lines of FIG. 5 between the legs 22 and 24 of the fastener body. During insertion, the toggle element is generally maintained in the aligned position by contact against a lower surface portion of the opening 12 in the wall panel. After the outer end of the aligned toggle element clears the inside or blind wall surface 18 of the wall panel, the toggle element is then free to pivot toward an upright or toggle locking position shown in solid lines in FIGS. 1 and 2 and in dotted lines in FIG. 5.

After the toggle element is pivoted into the upright position, the body 20 of the wall fastener is pulled outwardly until a locking surface on one face 30a of the toggle element bears against the wall surface 18.

During installation of the wall fastener, the body 20 is inserted longitudinally in the opening 12 until the inner end of the legs reach a position as shown in phantom in FIG. 1, wherein the outer end of the aligned toggle element 30 is clear or inside of wall face 18 of the panel 14. The toggle element pivots into the locking position and the legs 22 and 24 are pulled outwardly to bring the bearing surface 30a against the inside surface of the wall panel to secure the fastener 10 against withdrawal. After the toggle element is thus seated, the forward outer end portions of the legs 22 and 24 are bent over in opposite directions and seated against the outside surface 16 of the panel as shown in FIG. 2. For the purpose of facilitating the bending of the legs at a variety of different spaced positions thereof dependent on the wall thickness, each leg is provided with a plurality of transverse score lines 34 as illustrated best in FIG. 1 for bending or breaking off to reduce the extension of the legs beyond any fixture to be mounted to the wall for appearance purposes.

In accordance with the present invention, the hollow wall fastener 10 is provided with an integrally formed, deflectable finger 40 which biases the toggle element 30 into the toggle locking or upright position as shown in FIGS. 1 and 2. As indicated in FIG. 1, and deflectable finger 40 includes a free outer end 42 which extends between the legs 22 and 24 to engage an upper surface of the toggle element 30 when the element is in an aligned or longitudinal position and biases the element in a counterclockwise direction as indicated by the arrow in phantom in FIG. 1. As soon as the forward end of the toggle element clears the blind wall surface 18 of the panel 14, the deflectable finger becomes effective to insure that the toggle element pivots out of the aligned position (FIG. 5) into the locking position of FIGS. 1 and 2. The finger is integral with and extends from the cross-member 26 and thus no separate spring members or cams are required. Moreover, insertion of a screw separate fastener is not required to move the toggle element into the locking position as in prior wall fasteners.

The toggle element is formed with a transverse threaded bore 30b intersecting the transverse pivot axis adapted to receive the threaded shank of a separate screw fastener 44 which may be used. The fastener is insertable between the legs 22 and 24 from outside the hollow wall and when fully inserted may project through an aperture 26a in the cross-member 26.

Figure 6:
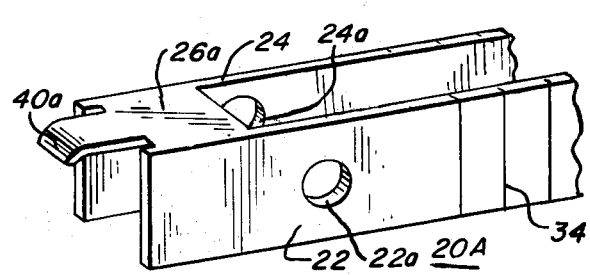
FIG. 6 is a fragmentary perspective view of another embodiment of an elongated body in accordance with the present invention.

Referring now to FIG. 6, therein is illustrated a modified form of fastener body referred to by the numeral 20A. The modified fastener body 20A differs from the body 20 previously described fastener in that an integral transverse cross-member 26A is positioned at extreme ends of the legs 22 and 24. An integrally formed spring finger 40A is connected to the transverse cross-member 26A and the spring finger extends beyond the ends of the legs 22 and 24 and the transverse pivot axis which is coaxial with the leg apertures 22a and 24a.

Figure 7:
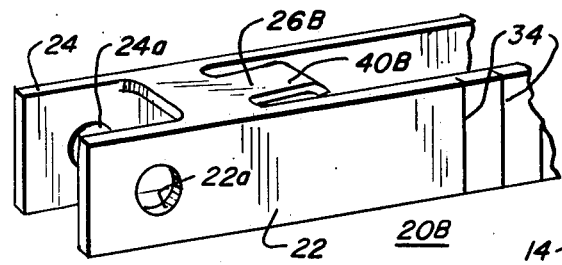
FIG. 7 is yet another embodiment of an elongated body in accordance with the present invention.

Referring to FIG. 7, another modified form of fastener body 20B is therein illustrated and this element employs an integral transverse cross-member 26B also spaced intermediately between the opposite ends of the legs 22 and 24. A deflectable finger 40B extending toward the outer ends of the legs is integral with the cross-member 26B. In all embodiments, the integral fingers act to bias the toggle block into a locking position.

Figure 8:
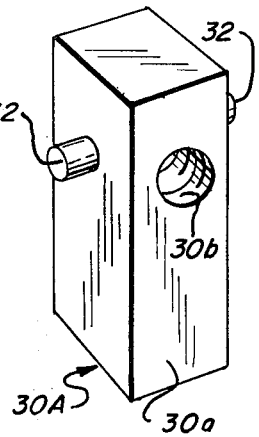
FIG. 8 is a perspective view of a modified form of toggle element in accordance with a feature of the present invention.
Figure 3:
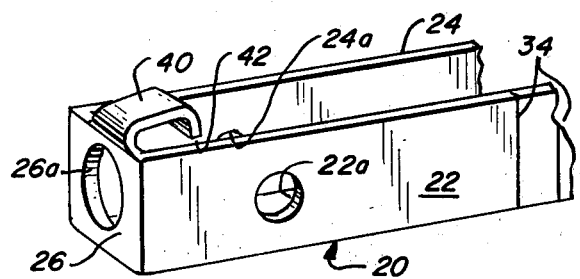
FIG. 3 is a fragmentary perspective view of one embodiment of an elongated body of a hollow wall fastener in accordance with the present invention.

Referring to FIG. 8, therein is illustrated a modified form of toggle element 30A wherein the transverse pivot axis which extends through the stub axles 32 is positioned eccentric of the center of gravity of the toggle element. Accordingly, the toggle element is additionally biased by gravity toward the locking position. As shown in FIG. 8, the toggle element will tend to assume a vertical position because the portion of the element below the axles 32 is longer and heavier in weight than the portion above the axles. Gravity biasing of toggle element 30A is in addition to the bias provided by the deflectable fingers so that the locking of the element is positively insured.

From the foregoing it will be seen that the novel hollow wall fastener 10 is economical to construct in that the body 20 is formed from one piece in a single stamping operation and no separate springs, cams or screws are required or needed to be assembled to bias the toggle element into the locking position as in the prior art. Preferably, the body 20 is formed in a single cut out and stamping operation from thin sheet metal. The toggle element is easily assembled with the body resulting in a novel hollow wall fastener 10 that is economical to manufacture, easy and fast to use, and reliable and fool-proof in operation with excellent holding power.

Although the present invention has been described with reference to several illustrative embodiments thereof, it should be understood that numerous other modifications and embodiments can be devised by those skilled in the art that will fall within the spirit and scope of the principles of this invention.

What is claimed as new and desired to be secured by Letters Patent of the United States is:

1. A hollow wall fastener for insertion in a hole formed in a wall panel between inner and outer faces comprising:

an elongated body adapted for longitudinal insertion in said hole from said outer face toward said inner face, said elongated body including a pair of spaced apart legs having free outer ends and opposite inner end portions interconnected by an integral cross member;

a toggle element pivotally mounted between said legs on axles extending into circular openings fixed in said legs adjacent said inner end portions for pivotal movement about a pivot axis extending transversely of said body, said toggle element being pivotal between a first position aligned with said legs for insertion of said body in said hole and a second position generally normal thereto wherein a face of said toggle element is adapted to bear against said inner face of said wall after said element clears said hole upon insertion of said body, said toggle element including a threaded aperture normal to said face thereof for receiving a threaded screw fastener when said toggle element is in said second position; and a deflectable finger integral with said cross member adjacent said toggle element and including a free end portion engageable with the toggle element for biasing said toggle element from said first position toward said second position.

2. The wall fastener of claim 1 wherein said legs include outer end portions transversely scored at spaced longitudinal intervals thereon to facilitate bending of said legs against said outer panel face after said toggle element is in said second position to firmly secure said wall fastener in said hole.

3. The wall fastener of claim 1 wherein said transverse cross member is positioned intermediate said toggle element pivot axis and the outer ends of said legs.

4. The wall fastener of claim 1 wherein said free end of said integral finger extends toward said outer ends of said legs.

5. The wall fastener of claim 1 wherein said free end of said integral finger extends toward said inner end portions cf said legs.

6. The wall fastener of claim 1 wherein said deflectable finger includes a curved segment having edges spaced inwardly of said legs and an outer free end portion normally positioned between said legs and deflectable out of said normal position by said toggle element during insertion of said wall fastener in said hole of said wall panel.

7. The wall fastener of claim 1 wherein said transverse pivot axis is positioned eccentric of the center of gravity of said toggle element whereby said toggle element is gravity biased toward said second position.

* * * * *